Patented Mar. 4, 1941

2,233,475

UNITED STATES PATENT OFFICE 2,233,475

CELLULOSE COMPOUNDS CONTAINING CARBOXY AND AMINE GROUPS

Henry Dreyfus, London, England

No Drawing. Application December 20, 1937, Serial No. 180,865. In Great Britain December 21, 1936

7 Claims. (Cl. 260—212)

This invention relates to improvements in the manufacture of cellulose derivative materials, and particularly to cellulose derivative materials which contain

groups and groups containing nitrogen.

I have discovered that cellulose derivative materials containing in substituent radicles both

groups indirectly attached to the cellulose nucleus and non-acidic groups containing nitrogen have an increased affinity for acid dyestuffs and a reduced inflammability, and the present specification is concerned with the production and use of such materials.

The cellulosic materials treated may be filaments, yarns, foils, films or the like, or materials in an "amorphous" condition, such, for example as cotton linters, wood pulp or cellulose derivatives precipitated from solution or separated from suspension. The materials may be natural cellulose materials, e. g. cotton, regenerated cellulose materials obtained by the viscose, cuprammonium or nitrocellulose processes or by the saponification of cellulose ester materials, or cellulose derivatives, e. g. cellulose triacetate or the ordinary commercial acetone-soluble cellulose acetate, cellulose propionate, butyrate, stearate, glycollate, acetate-glycollate, acrylate, meth-acrylate, crotonate, undecylenate, oleate, linoleate, ricinoleate, cinnamate, and other esters and mixed esters of cellulose, methyl, ethyl, butyl, vinyl, allyl, styryl, hydroxy-ethyl and ethyl hydroxy-ethyl celluloses and other ethers and mixed ethers of cellulose and ether esters, for example ethyl cellulose acetate and hydroxy-ethyl cellulose acetate. Cellulosic materials having a basis of cellulose derivatives already containing carboxy groups or groups containing nitrogen may also be treated. Examples of such derivatives are cellulose fumarate, maleate, oxalate, malonate, succinate, adipate, tartrate and phthalate, the glycine and cyanacetic acid esters of cellulose, the glycollic acid ether of cellulose and amino-ethyl cellulose. Further nitrogen-containing cellulose derivatives which may form the basis of materials treated according to the process of the present invention in order to introduce carboxy groups are described in my U. S. application S. No. 176,659 filed Nov. 26, 1937 corresponding to British applications Nos. 33,181/36, 33,182/36, 33,183/36, 33,184/36, 33,185/36 and 33,186/36 all filed December 3, 1936.

The materials, particularly natural cellulose materials, may be pretreated in order to increase their reactivity. For example, cotton linters or yarns may be pretreated with a hydrohalide acid or with formic acid, acetic acid or other organic acid, which may contain small proportions of sulphuric acid or other inorganic acid.

When cellulosic materials (including cellulose derivative materials) containing neither carboxy groups nor non-acidic groups containing nitrogen are treated, they may be reacted either with a reagent containing both a nitrogen-containing group and a carboxy group or group yielding a carboxy group or, simultaneously or successively, with two reagents, one of which contains a nitrogen-containing group and the other a carboxy group or group yielding a carboxy group. Cellulose derivative materials containing nitrogen-containing groups may be treated with reagents to introduce carboxy groups or groups yielding carboxy groups, while cellulose derivative materials containing carboxy groups may be treated with reagents to introduce nitrogen-containing groups. When reagents containing groups yielding carboxy groups are employed the cellulose derivative may subsequently be treated to form the carboxy group.

In carrying out the process of the present invention natural or regenerated cellulose materials or cellulose derivative materials containing or yielding free hydroxy groups either in the nucleus or in substituent radicles, may be esterified or etherified, for example with acid anhydrides or chlorides of di- or polybasic acids, or reacted with halogenated organic amines, or they may be treated with ammonia or primary or secondary organic bases so as to bring about linkage between the nitrogen atom and the atom to which the hydroxy group is attached. Cellulose ester materials containing no free hydroxy groups may for example be treated with halogenated reagents in the presence of basic substances, and cellulose derivatives containing reactive halogen atoms, e. g. chlor-ethyl cellulose, may be treated with ammonia or an organic base or with a salt of a dibasic or polybasic organic acid, e. g. malonic acid. Again cellulose derivative materials containing unsaturated linkages may be reacted with organic bases, ammonia, hydrocyanic acid or other reagents, either directly or after an intermediate treatment with halogen or halogenating agents. The groups characteristic of the products of the present invention may be introduced indirectly by other methods, for example cellulosic materials containing hydroxy groups may be reacted with an halogenated aldehyde or ketone so as to obtain a cellulose derivative containing a carbonyl grouping, and this may be converted into an oxime with hydroxyl-amine. The oxime may then, for example, be converted into a —CN group by dehydration with acetic anhydride, acetyl chloride or other suitable reagent, or may be reduced so as to form an NH₂ group.

The following methods of obtaining particular products according to the process of the invention may be mentioned.

(a) Reacting cellulose amino-acetate with oxalic acid or chloracetic acid so as to introduce carboxy groups.

(b) Reacting cellulose glycollic acid with chlorethylamine in the presence of a base.

(c) Reacting cellulose materials with chloracetyl glycine.

Examples of suitable reagents which contain or yield both carboxy groups and nitrogen-containing groups are amino acids and derivatives thereof, for example glycine, and the methyl and ethyl esters of glycine, ammonium carbamate, ethyl carbamate, oxamic acid, ethyl oxamate, chloracetyl glycine esters and chloracetyl alanine esters, β-chlor α-amino-propionic acid and chlor cyanacetic acid and esters thereof, and dibasic acids containing the —CN grouping, for example cyanmalonic acid and cyansuccinic acid. Reagents containing or yielding a carboxy group include chloracetic acid, ethylchlor acetate, chloracetonitrile, β-chlor acrylic acid and dibasic acids and derivatives thereof, for example succinic anhydride, phthalic anhydride, and cyanacetyl chloride.

When materials containing

groups are to be produced with the aid of agents containing —CN groups the intermediate products containing —CN groups are further treated to convert the —CN groups into

groups.

It is to be noted that the products of the present invention cannot be obtained by the simple esterification of nuclear cellulose hydroxy groups with mono-carboxylic acids containing no —CN groups or with derivatives thereof such as the anhydrides and such processes are not included in the present invention. Moreover, the invention is concerned only with the production of cellulose derivatives in which the

groups and the non-acidic groups are relatively firmly linked to the cellulose nucleus and not with salts of cellulose derivatives containing carboxy groups with ammonia or an organic base.

Among agents which may be employed for the introduction of the nitrogen-containing groups may be mentioned ammonia and primary, secondary and tertiary alkylamines and substitution derivatives thereof, for example the methyl- and ethyl-amines, ethanolamines and other alkylolamines, chlorethylamines, chloramylamines and other halogenated amines and ethylene diamine and other aliphatic amines containing two or more amino groups and substitution derivatives thereof. Acid amides, amino acids and derivatives thereof, for example acetamide, sarcosine anhydride and amino-acetic acid nitrile may be employed, as may also urea, thiourea and derivatives thereof, for example the diethyl ureas. Cyclic nitrogen-containing compounds may also be employed including heterocyclic compounds, for example pyridine and piperidine, cyclo-aliphatic compounds containing nitrogen in substituent groups, for example cyclohexylamine, and aromatic compounds, for example aniline and the phenylene diamines. Other agents which may be employed are hydrocyanic acid, cyanogen halides, mono-nitriles of dibasic acids, e. g. cyanacetic acid and cyanbenzoic acid, and acid chlorides thereof, and ethylene imine.

The invention is particularly concerned with cellulose derivative products which contain nitrogen in the form of unsubstituted amino or substituted amino groups, but it also includes products containing nitrogen in other groups, for example in the —CN grouping.

The process of the present invention may be carried out in the presence of suitable catalysts. For example, when it is desired to effect reaction between halogenated reagents and nuclear hydroxy groups or hydroxy groups contained in substituent radicles, caustic soda, triethylamine, dimethylaniline or other suitable inorganic or organic base may be employed, while if esterification with a carboxylic acid or anhydride is to be effected suitable catalysts are sulphuric acid, phosphoric acid and metallic halides, for example ferric, stannic and zinc halides, preferably used in conjunction with small proportions of hydrohalide acids. A reaction between an amino group and a hydroxy group contained in the nucleus or in a substituent radicle may be assisted by the use of metals or metal compounds, e. g. manganese sulphate and chloride, platinic chloride, copper sulphate and other metal compounds which form amines. Metals which may be employed include nickel, copper and iron. Other suitable catalysts for the reaction are oxides and hydrated oxides, e. g. thorium oxide, tungstic oxide and alumina. For further details with regard to the use of such catalysts reference is made to my U. S. application S. No. 176,659 filed Nov. 26, 1937 corresponding to British applications Nos. 33,181/36, 33,182/36, 33,183/36, 33,184/36, 33,185/36 and 33,186/36 all filed December 3, 1936.

The reactions may be effected in the presence only of the cellulose derivative or other cellulosic materials and the reagent, together with a catalyst if employed, or it may be carried out in the presence of a suitable diluent which may be gaseous or liquid. When the starting materials are yarns, foils or other formed articles and the treatment is effected in a liquid medium it is of course necessary that the medium as a whole should be a non-solvent for the articles if their structure is to be retained. Gaseous reagents may be employed alone or mixed with gaseous diluents, for example nitrogen, or dissolved in liquid diluents. Liquid reagents may be employed either alone or in admixture with liquid diluents, while in general when the reagent is solid it is necessary that it should be dissolved in a liquid diluent. Examples of suitable liquid diluents are water, alcohols, for example methyl, ethyl and propyl alcohols and cyclohexanol, hydrocarbons, for example benzene, toluene, tetrahydronaphthalene, decahydronaphthalene and kerosene, chlorinated hydrocarbons, e. g. methylene chloride and carbon tetrachloride, and ethers, for example isopropyl, butyl and amyl ethers.

The reactions may be facilitated by the use of a diluent or mixture of diluents which has a swelling action on the starting materials and/or the products.

The reactions may be carried out at ordinary temperatures or at a temperature below atmospheric, for example a temperature of 10° C. or 0° C. or even less, or at a super-atmospheric temperature, for example a temperature of 50, 100 or 150° C. or more. Similarly the reaction may be effected at atmospheric pressure or at a pressure above atmospheric, for example a pressure of 10, 25 or 50 atmospheres or more. The duration of reaction will, of course, depend upon the reaction conditions, including the nature of the cellulosic materials and the reactant, the catalyst, if employed, and the temperature and pressure, and it may be, for example, 5, 10 or 20 hours or more.

On completion of a reaction the cellulose derivative materials may be separated from the reaction medium, washed and dried. They may contain nitrogen in a proportion of, for example, 5, 10 or 15% or more. As stated above, by the process of the present invention cellulose derivative materials having an increased affinity for acid dyestuffs and a decreased inflammability may be obtained. Cellulose derivative materials containing diazotisable amino groups may be diazotised so that dyestuffs may be formed by direct reaction with the products. Further, products obtained with nitrogen-containing reagents containing primary amino groups or two or more reactive nitrogen-containing groups may have an increased resistance to creasing.

The following examples illustrate the invention, but are not to be regarded as limiting it in any way:

*Example 1*

Cotton linters which have been impregnated with sodium hydroxide by immersing them in excess of a 15 to 20% aqueous solution of sodium hydroxide and squeezing out until the weight of the mass is 200 to 300% of that of the original linters are treated in a closed vessel at a temperature of 60 to 80° C. with an aqueous medium containing chloracetic acid and chlorethylamine each in about 4 to 6 molecular proportions based on the weight of the linters until a product containing about 0.5 to 1 substituent radicle for each $C_6H_{10}O_5$ unit is obtained. The product is then separated from the etherification medium, washed first with a dilute solution of hydrochloric acid until it is free from alkali and then with water, and is dried at a low temperature, for example 40 to 60° C. It is then acetylated in a medium containing about 400% of acetic acid, 400% of acetic anhydride and about 10% of sulphuric acid at a temperature of 25 to 35° C. until a clear solution is obtained. The product is then precipitated and dried.

*Example 2*

Cellulose acetate yarn in hank form is heated for 4-6 hours at a temperature of 70-80° C. in an aqueous medium containing about two molecular equivalents of chloracetyl glycine ethyl ester and two molecular equivalents of ammonium hydroxide per $C_6H_{10}O_5$ unit. It is then separated, washed and dried.

*Example 3*

A yarn containing about 1 carboxy-methyl radicle per $C_6H_{10}O_5$ unit is produced by treating regenerated cellulose yarn with sodium hydroxide and chloracetic acid as described in Example 1, the chlorethylamine being omitted. The product is then heated in a closed vessel for 2-3 hours at a temperature of 150-180° C. in about eight times its weight of a 20% solution of ethylamine containing about 3%, based on the yarn, of manganese sulphate. After cooling the products are removed, washed with dilute acid and water and dried.

The products may be subjected to further treatments. For example products containing free hydroxy groups or nitrogen-containing groups containing replaceable hydrogen atoms may be etherified, alkylated, aralkylated, esterified or acylated by reaction with ethyl chloride, benzyl chloride, acetic anhydride, acetyl chloride and other reagents, while products containing the nitrile group may be reduced, hydrated or hydrolysed to convert the group into a —$CH_2NH_2$, —$CONH_2$ or —$COOH$ group respectively.

Having described my invention, what I desire to secure by Letters Patent is:

1. Process for the production of cellulose derivative materials having an increased affinity for acid dyestuffs and a reduced inflammability, which comprises introducing carboxy groups and groups containing non-acidic nitrogen into cellulosic materials by treating the cellulosic materials in an aqueous medium containing a compound selected from the group consisting of chloracetic acid, ethylchlor acetate, chloracetonitrile and cyanacetyl chloride and a halogenated amine so as to form cellulose derivatives in which

groups and non-acidic groups are relatively firmly linked to the cellulose nucleus.

2. Process according to claim 1 wherein the cellulose derivative materials are subsequently acetylated.

3. Process for the production of cellulose derivative materials having an increased affinity for acid dyestuffs and a reduced inflammability, which comprises introducing carboxy groups and groups containing non-acidic nitrogen into cellulosic materials containing an acidyl radicle by treating the cellulosic materials containing an acidyl radicle with an aqueous medium containing a compound selected from the group consisting of chloracetic acid, ethylchlor acetate, chloraceto-nitrile and cyanacetyl chloride and a halogenated amine so as to form cellulose derivatives in which

groups and non-acidic groups are relatively firmly linked to the cellulose nucleus.

4. Process for the production of cellulose derivative materials having an increased affinity for acid dyestuffs and a reduced inflammability, which comprises introducing carboxy groups and groups containing non-acidic nitrogen into yarns, foils and similar formed cellulosic materials by treating such formed cellulosic materials with an aqueous medium containing a compound selected from the group consisting of chloracetic acid, ethylchlor acetate, chloraceto-nitrile and cyanacetyl chloride and a halogenated amine so as to form cellulose derivative materials in which

groups and the non-acidic groups of cellulose derivatives are relatively firmly linked to the cellulose nucleus.

5. Process for the production of cellulose derivative materials having an increased affinity for acid dyestuffs and a reduced inflammability, which comprises treating cellulosic materials which contain a primary amino group with an aqueous medium containing a compound selected from the group consisting of chloracetic acid, ethylchlor acetate, chloraceto-nitrile and cyanacetyl chloride so as to form a cellulose derivative in which the primary amino group and a $$O=\overset{|}{C}O-$$

group are relatively firmly linked to the cellulose nucleus.

6. Process for the production of cellulose derivative materials having an increased affinity for acid dyestuffs and a reduced inflammability, which comprises treating cellulosic materials with an aqueous medium containing a compound selected from the group consisting of chloracetic acid, ethylchlor acetate, chloraceto-nitrile and cyanacetyl chloride, and a compound which contains a primary amino group so as to form a cellulose derivative in which a $$O=\overset{|}{C}O-$$

group and the primary amino group are relatively firmly linked to the cellulose nucleus.

7. Process for the production of cellulose derivative materials having an increased affinity for acid dyestuffs and a reduced inflammability, which comprises treating cellulosic materials which contain free hydroxy groups with an aqueous solution containing a reagent which contains an amino group and a catalyst selected from the group consisting of metals and metal compounds, and then treating the resultant product with a compound selected from the group consisting of chloracetic acid, ethylchlor acetate, chloraceto-nitrile and cyanacetyl chloride so as to form a cellulose derivative in which the amino group and a $$O=\overset{|}{C}O-$$

group are firmly linked to the cellulose nucleus.

HENRY DREYFUS.